UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

DISK-SCRAPER.

1,251,874.     Specification of Letters Patent.     Patented Jan. 1, 1918.

Original application filed June 5, 1915, Serial No. 32,266. Divided and this application filed November 15, 1915. Serial No. 61,465.

*To all whom it may concern:*

Be it known that I, HARRY S. DICKINSON, a citizen of the United States, residing at Moline, in the county of Rock Island and State of Illinois, have invented certain new and useful Improvements in Disk-Scrapers, of which the following is a specification, reference being had therein to the accompanying drawing, the same being a division of original application filed June 5, 1915, Ser. No. 32,266.

This invention relates to disk scrapers for agricultural implements, and has reference more particularly to scraping devices employed in connection with the disks of disk harrows, to free the disks of adhering soil or trash.

The invention aims to produce a simple, durable and effective construction by which the adhering matters will be removed automatically from the face of the disk in the rotation of the latter, and which construction will not require any care or attention of the driver in its operation.

With these ends in view, my invention consists of a scraper in the form of a blade secured in fixed relation to the disk, and of such novel form and construction, and so disposed relatively to the concave face of the disk, that the adhering soil will be removed therefrom effectively and continuously as the disk rotates in the advance of the machine.

Figure 1:
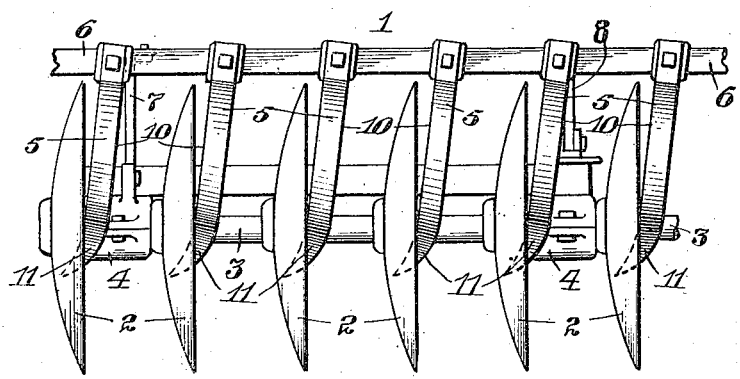
Figure 1 is a rear elevation of the disk gang of a disk harrow having my invention embodied therein.
Figure 2:
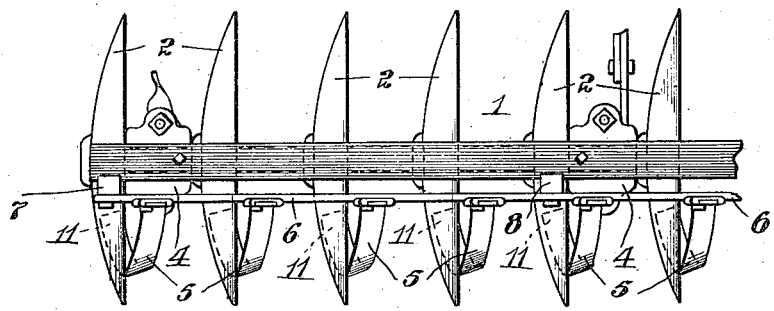
Fig. 2 is a top plan view of the same.
Figure 3:
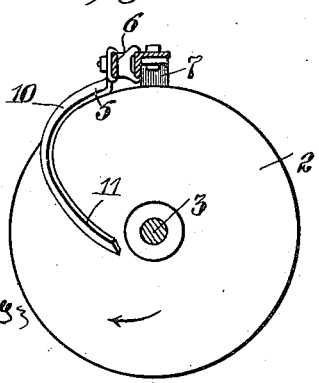
Fig. 3 is a cross-section through the gang showing one of the disks and its scraper in side elevation.
Figure 4:
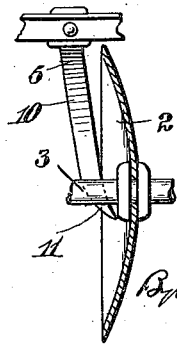
Fig. 4 is a front sectional elevation of a disk and its scraper.

Referring to the drawings: 1 represents a disk gang comprising a series of concavo-convex disks 2, mounted for rotation on a supporting axle 3 sustained in suitable bearings 4 mounted on the frame of the machine. 5 represents my improved scrapers consisting of flat steel blades coöperating with the concave faces of the disk in rear of their axes. The upper ends of the blades are connected fixedly to the rear side of a horizontal transverse bar 6, fixedly supported above the disks by standards 7 and 8 extending upwardly from the bearings of the axles, the blades being disposed edgewise to the disks. Each blade is inclined in an edgewise direction from its upper end toward the adjacent disk, and from its upper end it curves rearwardly and downwardly as at 10 and follows for some distance the general curvature of the edge of the disk, and crossing the latter at some distance above the center of the disk, it curves downwardly and forwardly as at 11 and terminates at its lower end just below and in rear of the disk's axis. The blade is somewhat away from the disk at the point where it crosses the periphery, and as it approaches the center, it is brought almost at its lower end in contact with the face of the disk. The portion of the blade within the disk's area is inclined forwardly slightly so that its outer edge will be in advance of its inner edge, thereby presenting to the adhering soil, a flat rear surface extending outwardly and forwardly from the face of the disk. In the rotation of the disks in the direction of the arrow in Fig. 3, the adhering soil will be carried against the rear inclined surfaces of the blades, and will be dislodged and pushed away from the disks in a uniform and continuous manner.

It is to be noted that my improved scraper blades require no attention or operation on the part of the driver, as they occupy permanent fixed relations to the disks, and act automatically to keep the same free of adhering soil or trash, without the necessity of their periodic bodily movement across the face of the disk, as is the common practice with many forms of scrapers.

The connection of the upper ends of the blades with their supporting bar may be of such character as to provide for the adjustment of the blades transversely or vertically, or in other directions, in order that they may be permanently set in proper operative relations to the respective disks.

In the accompanying drawings and foregoing description, I have disclosed my invention in the particular form which I prefer to adopt and which in practice has been found to answer to a satisfactory degree the ends to be attained. It will be manifest however to the skilled mechanic, that various changes and modifications in the construction may be made without departing from the limits of the invention; and it will be understood that the invention is not limited to any particular form or construction of the parts, except in so far as such limitations are specified in the claim.

Having thus described my invention, what I claim is:

In combination with a disk having a concave face, a scraper blade therefor fixed at its upper end relatively to the disk and disposed generally edgewise relatively to the disk, the said blade extending from its upper end obliquely toward the face of the disk and curving rearwardly and downwardly from its upper end for some distance coincident with the curved edge of the disk and intersecting said edge at a point in rear of the disk's axis, and then curving forwardly and downwardly terminates at its lower end adjacent the face of the disk in rear of and below the axis of the same with its inner edge at the lower end arranged closely adjacent the face of the disk to act with a scraping function, the portion of the blade within the disk's area being inclined from its inner edge outwardly and forwardly so that its outer edge will be in advance of its inner edge, and so that it will present to the adhering soil carried upwardly and rearwardly by the disk, a forwardly and outwardly inclined deflecting surface.

In testimony whereof, I have affixed my signature.

HARRY S. DICKINSON.

Copies of this patent may be obtained for five cents each, by addressing the "Commissioner of Patents, Washington, D. C."